Figure 1:
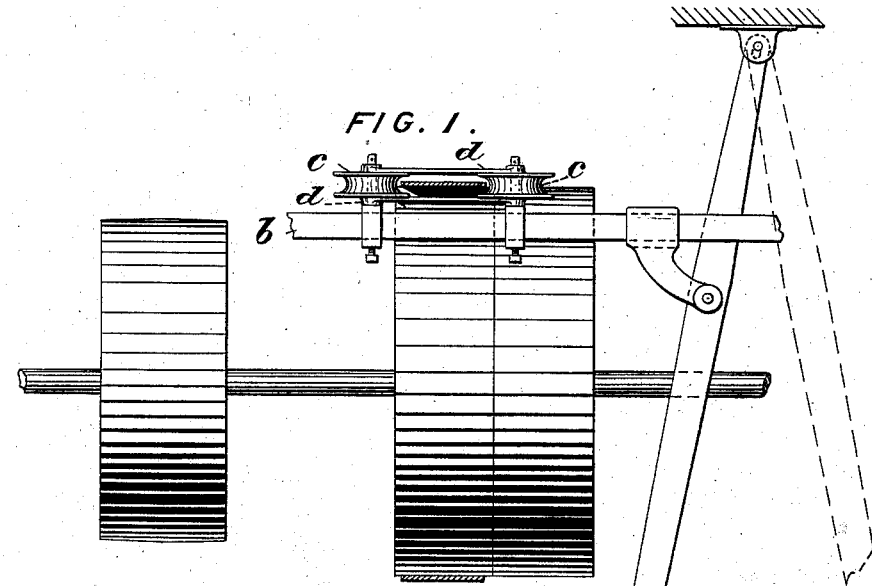

D. C. NEWELL.
Belt-Shipper.

No. 205,408. Patented June 25, 1878.

WITNESSES.

INVENTOR.

UNITED STATES PATENT OFFICE.

DARIUS C. NEWELL, OF YONKERS, NEW YORK.

IMPROVEMENT IN BELT-SHIPPERS.

Specification forming part of Letters Patent No. 205,408, dated June 25, 1878; application filed June 11, 1878.

*To all whom it may concern:*

Be it known that I, DARIUS C. NEWELL, of Yonkers, in the county of Westchester and State of New York, have invented a new and useful Improvement in Belt-Shippers, of which the following is a specification:

The object of the said invention is to enable the belts that are used for the transmission of power to be more easily shifted from one pulley to another, and to obviate the wear that is involved in the employment of the ordinary devices, by which they are pressed on the edge and forced into the desired position.

The improvement consists in mounting a loose friction-wheel upon each end of the fork of an ordinary belt-shipper, so that the bearing upon the belt will be by the wheel, which will revolve and lessen the friction, and will yield to any roughness or joint in the belt instead of resisting and tending to tear it. The friction-wheels are grooved, and a cross-bar or yoke that connects and steadies them incloses the belt and retains it between the wheels.

To enable others skilled in the art to which it appertains to make and use my invention, I will proceed to describe its construction and operation with reference to the drawing.

Figure 2:
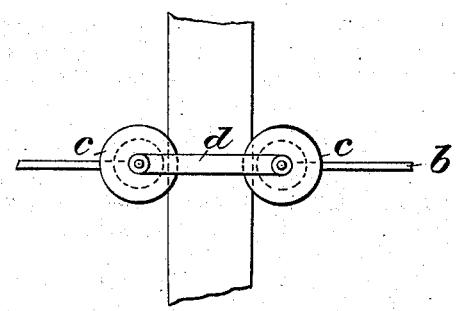

Figure 1 represents an elevation of a belt-shipper made according to my invention, in connection with a set of pulleys, and Fig. 2 is a plan of the belt where it passes through the shipper.

The handle $a$ works the slide $b$ in any of the ordinary ways, and the friction-wheels $c$, with the cross-bars $d$ extending between them, inclose the belt and shift it in accordance with the motion of the handle.

I claim as my invention—

The combination, with any form of belt-shipper, of the friction-wheels $c$ inclosing the belt, substantially as described.

DARIUS C. NEWELL.

Witnesses:
  SIMSON WOLF,
  WM. KEMBLE HALL.